United States Patent [19]

Becker et al.

[11] Patent Number: 4,815,794

[45] Date of Patent: Mar. 28, 1989

[54] TRACK CHAIN ROLLER WITH DEGRADABLE SPACER RINGS

[75] Inventors: Werner Becker, Hattingen; Helmut Klaus, Hagen; Heinz Lause, Recklinghausen, all of Fed. Rep. of Germany

[73] Assignee: Intertractor Viehmann GmbH & Co., Gevelsberg, Fed. Rep. of Germany

[21] Appl. No.: 155,239

[22] Filed: Feb. 12, 1988

[30] Foreign Application Priority Data

Mar. 27, 1987 [DE] Fed. Rep. of Germany ....... 3710104

[51] Int. Cl.$^4$ ............................................. B62D 55/08
[52] U.S. Cl. ....................................... 305/14; 305/60; 29/123; 384/428; 403/2
[58] Field of Search ...................... 29/123; 305/14, 21, 305/56, 60; 384/428; 403/2

[56] References Cited

U.S. PATENT DOCUMENTS 2,926,968  3/1960  Toth ................................... 305/14 X
3,482,125  12/1969  Fleckenstein ................... 384/428 X
3,773,393  11/1973  Story et al. ............................ 305/14

*Primary Examiner*—Robert B. Reeves
*Assistant Examiner*—Russell D. Stormer
*Attorney, Agent, or Firm*—Herbert Dubno

[57] ABSTRACT

The rotatably mountable track chain roller has two molded axle journal stubs which each engage rotatably in an end cap formed as a radial and axial bearing. Further expecially the track chain roller is provided with lubricant material for its bearings which has a lubricant action on them. An easy and economical manufacture for the track chain roller results when at least one spacer suitable for providing a set value of axial play in the axial direction of the track chain roller is clamped between the track chain roller and one of the end caps without play. The spacer is made of a soft grindable lubricant-resistant material which does not influence the lubricant action and which is grindable against the track chain roller, the axial journal and the end cap. The spacer can be ring shaped and have a plurality of approximately equal width spacing maintaining regions distributed approximately equally circumferentially around the ring and connected by straps of a narrower width. Advantageously the width of the straps is approximately a fifth of the width of the spacing maintaining regions.

11 Claims, 2 Drawing Sheets

4,815,794

TRACK CHAIN ROLLER WITH DEGRADABLE SPACER RINGS

FIELD OF THE INVENTION

Our present invention relates to a rotatably mountable track chain roller.

BACKGROUND OF THE INVENTION

A rotatably mountable track chain roller can have a roller body formed with axle journal stubs formed by casting and forging or machining which are fixed in position in a vehicle frame and which each engage rotatably in an end cap formed as or with a radial and axial bearing.

Moreover the track chain roller has a hollow chamber filled with lubricant material for the bearings which can be sealed from the exterior.

The end caps are fixed in position on the vehicle frame to rotatably support the roll body thereon.

A track chain roller of this type is described in German Utility Model DE-GM 85 23 108.8. There the end caps mounted on the axle journal stubs are attached to one another rigidly, e.g. by a rod which passes through the axle journal stubs and the roll body, so that the track chain roller can be assembled in a unit which can be mounted without disassembly. The desired axial play of the bearing is guaranteed by the rod so that among other things a considerable assembly simplification results, i.e. the difficulty of ensuring axial play is eliminated.

U.S. Pat. No. 4,594,846 describes the use of a wear degradable material to ensure axial play in a track pivot pin.

OBJECTS OF THE INVENTION

It is an object of our invention to provide an improved track chain roller which will simplify its mounting in the vehicle frame or undercarriage but will also eliminate the need for the aforementioned rod.

It is also an object of our invention to provide an improved track chain roller in which the desired axial play of the bearing is guaranteed and a mounting simplification results so that the device can be manufactured in a simple and economical manner and has reduced weight by comparison with the prior art roller.

SUMMARY OF THE INVENTION

These objects and others which will become more readily apparent hereinafter are attained in accordance with our invention in a rotatably mountable track chain roller having a roller body formed at its opposite ends with two axle journal stubs which are fixed in position in a vehicle frame and each engage rotatably in an end cap formed as a radial and axial bearing. Moreover advantageously the track chain roller has a hollow chamber filled with lubricant material which is connected with the bearings of the track chain roller, which are sealed from the exterior, by a plurality of ducts located in the track chain roller. Each of the end caps can be fixed accurately in position relative to the roll body by appropriate mounting means on the vehicle frame or chassis engageable with the end caps.

According to our invention at least one spacer suitable for providing a set value of axial play in the axial direction of the track chain roller is clamped between the track chain roller body and one of the end caps without play and the spacer is made of a soft grindable (wear-degradable) lubricant-resistant material (e.g. of pressed paper material) which does not influence the lubricant action and which is grindable against the track chain roller, the axle journal stubs and the end caps.

The spacer is a ring surrounding the axle journal which has a plurality of wide spacing maintaining regions uniformly distributed and spaced from each other about the circumference of the ring which are connected with each other by webs of smaller width than each of the spacing maintaining regions.

The spacer or spacers, can be manufactured at negligible cost and guarantee the desired or set axial play after being mounted comparatively short time after being put into operation and because open recesses or pockets are provided to receive the wear degraded particles.

Only a comparatively inexpensive and simple taut band or the like which is removed after mounting of the track chain roller in the vehicle frame can be used for holding the caps on the roller body and for mounting the chain roller in the correct position in the vehicle frame and for securing the end caps relative to the chain roller reliably.

The high tolerance, comparatively expensive and relatively heavy end cap connecting rods or the like which have been used heretofore, are no longer required.

Advantageously the spacer can be made from a plurality of densely packed compact particles including paper particles but also noncellulosic particles, e.g. particles of a polymer fused together in a monolayer or the like. This construction should be distinguished from a fibrous paper structure in which fibers intertwine. The material made simply by pressing the compact paper particles together will be described as a pressed mass of compact paper particles.

As previously mentioned the spacer is a ring so that its mounting is considerably simplified and it can be easily reliably positioned correctly, the ring comprising a plurality of spacing maintaining regions distributed substantially equally circumferentially connected by narrower and/or smaller webs or connecting pieces.

Because of this particular structure for the spacer a considerable volume reduction of the spacer or spacers results without effecting the desired axial play. The connecting webs provide sites for breaking after start of operation of the chain roller which considerably improve the desired wear degradation or crumbling of the spacer. The comparatively small volume of the spacer also has that effect.

The ratio of the collective circumferential length of all of the spacing maintaining regions to the collective circumferential length of the webs can be 1:5 and the webs can have a width which is approximately a fifth of the width of the spacing maintaining regions.

Moreover it is also advantageous when a plurality of depressions or recesses are provided to receive the degraded material and have a total volume corresponds at least to the total volume of the spacer are provided in the bearing surfaces of the chain roller and/or the end caps on which the spacer bears. Also the depressions or recesses can be located in the vicinity of the straps.

This has the advantage that the particles formed by grinding upon the spacer on rotation of the chain roller are accommodated in the depressions and thus do not reach the lubricant material.

A taut band can be provided circumferentially about both of the end caps as the retaining member.

While only a single space is absolutely necessary to set the axial plug for both end caps in practice, two such spacers are preferred, one at each end cap.

BRIEF DESCRIPTION OF THE DRAWING

The above and other objects, features and advantages of our invention will become more readily apparent from the following description, reference being made to the accompanying highly diagrammatic drawing in which.

FIG. I is a longitudinal cross sectional view through a track chain or caterpillar roller according to our invention.

SPECIFIC DESCRIPTION

Figure 1:
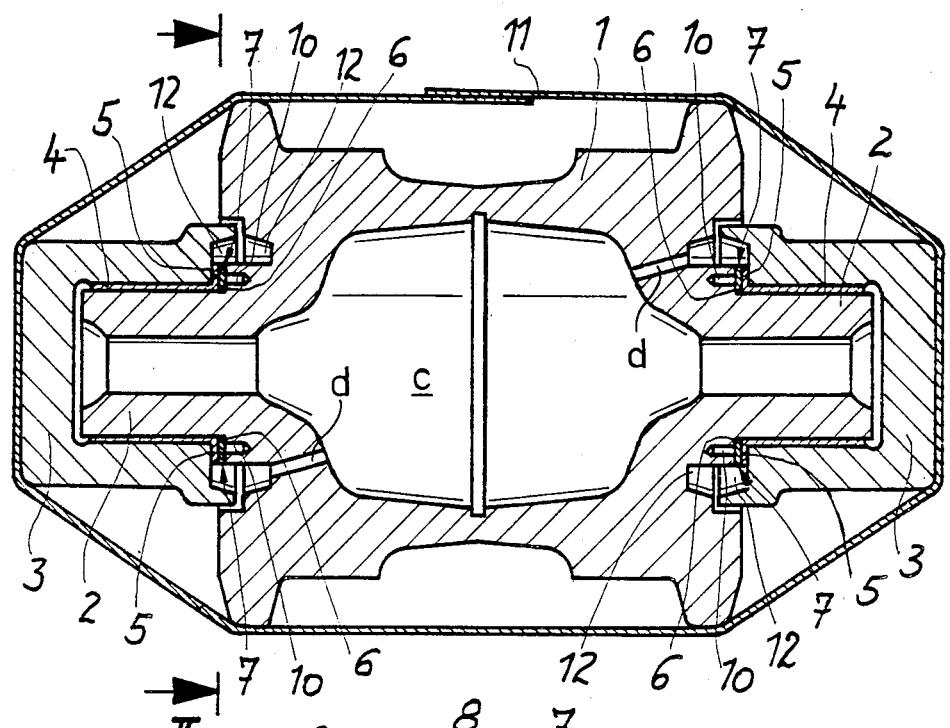
Figure 2:
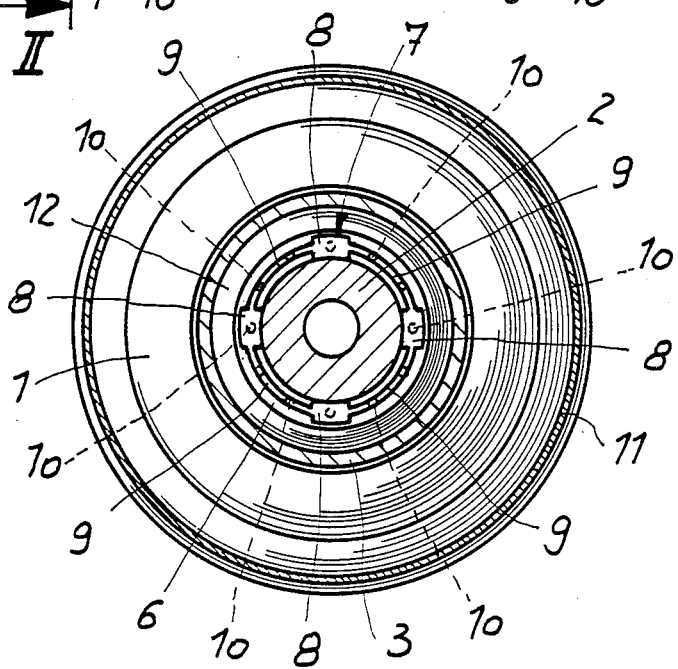
FIG. 2 is a cross sectional view taken along the section line II—II in FIG. 1.

The track chain guide roller shown in the drawing comprises a hollow wheel body 1 assembled from two parts welded together is used to support the track of a tracked vehicle and with two coaxial molded axle journal stubs 2 extending in opposite directions and two end caps 3 which are formed as radial and axial bearings.

Bearing bushings 4 which have integral flanges 5 forming axial bearings are inserted in the end caps 3. The flanges 5 are positioned against a ringlike bearing surface 6 on the wheel body 1. A circular spacer 7 made of a pressed mass of compact paper particles is clamped between the bearing surface 6 and the flange 5 of the bearing bushing 4. The thickness of both spacers 7 corresponds to the set or desired value of axial play in the axial bearing.

Sometimes it is advantageous to provide only one spacer 7 in the vicinity of one axle journal 2 whose thickness equals the desired value of the axial play in both axial bearings.

The circular shaped spacer 7 has four spacing maintaining regions 8 distributed uniformly about its circumference and spaced from each other whose width is nearly equal to the width of the ring like bearing surface 6. Adjacent spacing maintaining regions 8 are connected with each other by an integral web 9 whose width is considerably less than that of the spacing maintaining regions 8.

Furthermore a plurality of depressions or recesses 10 formed by blind bores opening onto the bearing surface 6 are provided whose total volume at least corresponds to the volume of the spacer 7. Advantageously the total volume of the depressions is larger than the volume of the spacer.

A taut wrap 11 passes around the assembly and holds the end caps 3 mounted on the axle journal stubs 2 are pressed toward each other and simultaneously clamps the spacers 7 without play between the flanges 5 and the bearing surfaces 6.

In this state the track chain roller is inserted in the correct position in the vehicle frame and next the taut band 11 is removed. The end caps 3 engage and are held by mounts in the vehicle frame. Then the track is driven to rotate the roller so that after a comparatively short time the spacer 7 is completely ground up or pulverized and its particles collect in the depressions or recesses 10 whereafter the track chain roller may rotate with the desired value of axial play.

Ring seals which themselves are known are located in the hollow spaces 12 between the roller body 1 and the end cap 3.

It is particularly advantageous when the hollow track chain wheel body 1 has a hollow chamber c filled with a lubricant material. This hollow chamber c can be connected by a plurality of ducts d with the hollow space 12 between the roller body 1 and the end cap 3 so that the bearing between the end cap 3 and the wheel body 1 can be lubricated.

Figure 3:
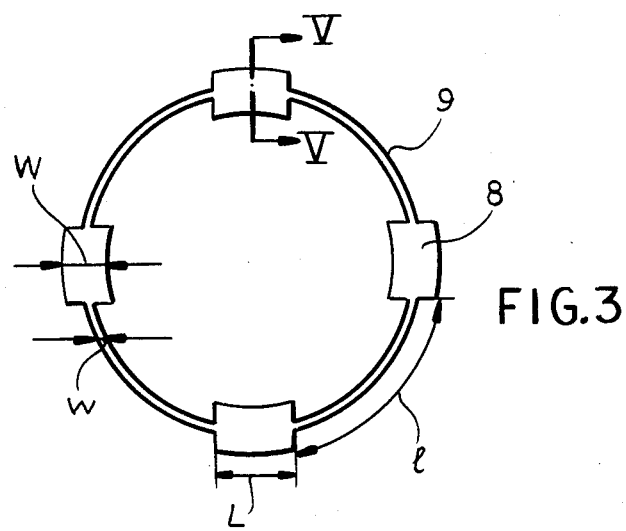
FIG. 3 is an enlarged elevation of a spacer ring.
Figure 4:
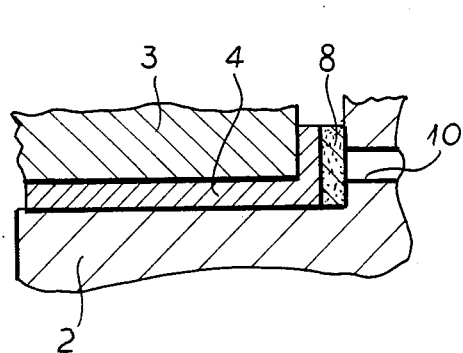
FIG. 4 is a detail section showing the ring in position.
Figure 5:
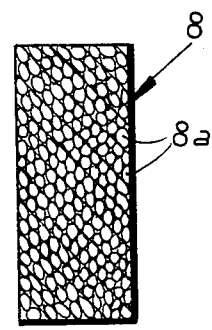
FIG. 5 is a section along line V—V of FIG. 3.

As can be seen from FIG. 3, the ratio of collective circumferential lengths $4 \times 1$ of the regions to the circumferential lengths $4 \times 1$ of the webs 9 is about 1:5 while the width w of the webs 9 is about 1/5 the width w of the wide regions 8. The particles 8a which form the compacted material of the spacers (FIG. 5) are held together by the pressing action without material fiber intertwining.

We claim:

1. In a rotatably mountable track chain roller with a roller body formed with axle journal stubs which are fixed in position in a vehicle frame and each engage rotatably in an end cap formed as a radial and axial bearing and moreover particularly said track chain roller has a hollow chamber filled with lubricant material for said bearings of said track chain roller which is connected with said bearings of said track chain roller sealed from the exterior by a plurality of ducts located in said track chain roller and each of said end caps is fixed correctly in position relative to said track chain roller with a retaining member engaged on said end cap, the improvement wherein at least one spacer suitable for providing a set value of axial play in the axial direction of said track chain roller is clamped between said body and one of said end caps without play and said spacer is a soft grindable lubricant-resistant material which does not influence lubricant action constituted of pressed compact paper particles without fiber intertwining, and which is grindable against said track chain roller, said axle journal stubs and said end caps.

2. In a rotatably mountable track chain roller with a roller body having two axle journal stubs formed thereon and which each engage rotatably in an end cap formed as a radial and axial bearing the improvement wherein at least one spacer suitable for a set value of axial play in the axial direction of said track chain roller is clamped between said track chain roller and one of said end caps without play and said spacer is made of a soft grindable lubricant-resistant material which does not influence said lubricant action which is grindable against said track chain roller, one of said axle journal stubs and a respective end cap, said spacer being a ring having a plurality of spacing maintaining regions uniformly distributed and spaced from each other about the circumference of said ring which are connected with each other by webs of smaller thickness than each of said spacing maintaining regions.

3. The improvement defined in claim 2 wherein said spacer is made from a plurality of densely packed particles.

4. The improvement defined in claim 3 wherein the ratio of the collective length of all of said spacing maintaining zones to the collective length of all of said webs measured in the direction of said circumference of said ring is about 1:5.

5. The improvement defined in claim 4 wherein the widths of said webs corresponds to approximately a fifth of the widths of said spacing maintaining zones.

6. The improvement defined in claim 2 wherein a plurality of depressions whose total volume corresponds at least to the total volume of said spacer are provided in one of the surfaces on which said spacer bears.

7. The improved defined in claim 6 wherein said depressions are formed in an end cap.

8. The improvement defined in claim 7 wherein said depressions are located in the vicinity of said webs.

9. The improvement defined in claim 8 wherein two such spacers are provided, one for each of said end caps.

10. The improvement defined in claim 2 wherein a taut wrap is provided about both of said end caps and said body to hold them together for mounting as a unit in a vehicle chassis.

11. A rotatably mountable track chain roller comprising:
- a roller body formed with two axle journal stubs directed oppositely to each other;
- a respective end cap formed as a radial and axial bearing in which each of said axle journal stubs engages rotatably, lubricant material being provided for said bearings of said track chain roller which has a lubricant action on said bearings; and
- a respective spacer suitable for providing a set value of axial play in the axial direction of said track chain roller clamped between lack of said stubs and a respective one of said end caps without play and made of a soft grindable, lubricant-resistant material which does not influence said lubricant action which is grindable against said body, stubs and end caps, said spacers each being a ring surrounding said axle journal comprising a plurality of spacing maintaining regions uniformly distributed and spaced from each other about the circumference of said ring which are connected with each other by webs of smaller thickness than each of said spacing maintaining regions, the collective lengths of all of said spacing maintaining zones and the collective length of all of said webs measured in the direction of said circumference of said ring being the ratio of 1:5 and the width of said webs corresponding to approximately a fifth of the width of said spacing maintaining zones.

* * * * *